(12) United States Patent
Rehme

(10) Patent No.: US 10,052,821 B2
(45) Date of Patent: Aug. 21, 2018

(54) METHOD AND DEVICE FOR POWDER BED-BASED ADDITIVE PRODUCTION OF A COMPONENT

(71) Applicant: SIEMENS AKTIENGESELLSCHAFT, Munich (DE)

(72) Inventor: Olaf Rehme, Hamburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 516 days.

(21) Appl. No.: 14/429,396

(22) PCT Filed: Sep. 12, 2013

(86) PCT No.: PCT/EP2013/068875
§ 371 (c)(1),
(2) Date: Mar. 19, 2015

(87) PCT Pub. No.: WO2014/044589
PCT Pub. Date: Mar. 27, 2014

(65) Prior Publication Data
US 2015/0251355 A1   Sep. 10, 2015

(30) Foreign Application Priority Data
Sep. 19, 2012   (DE) .......... 10 2012 216 793

(51) Int. Cl.
*B29C 67/00*   (2017.01)
*B29C 64/153*   (2017.01)
(Continued)

(52) U.S. Cl.
CPC ........ *B29C 67/0085* (2013.01); *B29C 64/153* (2017.08); *B29C 64/20* (2017.08);
(Continued)

(58) Field of Classification Search
CPC ... B29C 67/0085; B29C 64/20; B20C 64/153; B33Y 10/00; B33Y 30/00; B29K 2105/251
See application file for complete search history.

(56) References Cited

U.S. PATENT DOCUMENTS 3,673,296 A * 6/1972 Timko .................... B05C 19/04
264/126
5,198,159 A * 3/1993 Nakamura ............ B29C 64/135
156/273.5

(Continued)

FOREIGN PATENT DOCUMENTS

DE   2008814   11/1970
DE   10 2012 216 793.5   9/2012
(Continued)

OTHER PUBLICATIONS

English language International Search Report for PCT/EP2013/068875, dated Dec. 5, 2013, 2 pages.
(Continued)

*Primary Examiner* — Jacob T Minskey
*Assistant Examiner* — Melody Tsui
(74) *Attorney, Agent, or Firm* — Slayden Grubert Beard PLLC

(57) ABSTRACT

A method uses a powder bed-based additive production of components such as laser melting. The interior wall of a hollow cylinder is used as a construction platform. Progressive production of the component is possible by rotating the hollow cylinder step-by-step in direction. This allows production of components without set-up times as the components can emerge from the powder bed as rotation continues and can be separated from the hollow cylinder by a separating device. The space requirement for the hollow cylinder in this arrangement is relatively small.

9 Claims, 2 Drawing Sheets

(51) Int. Cl.
*B29C 64/20* (2017.01)
*B33Y 10/00* (2015.01)
*B33Y 30/00* (2015.01)
*B29K 105/00* (2006.01)

(52) U.S. Cl.
CPC ......... *B29K 2105/251* (2013.01); *B33Y 10/00* (2014.12); *B33Y 30/00* (2014.12)

(56) References Cited

U.S. PATENT DOCUMENTS

| | | |
|---|---|---|
| 8,524,142 B2 | 9/2013 | Uckelmann et al. |
| 2011/0192997 A1* | 8/2011 | Vogtmeier ............ B22F 3/1055 250/505.1 |
| 2012/0165969 A1* | 6/2012 | Elsey .................. B29C 67/0059 700/120 |
| 2014/0242231 A1* | 8/2014 | Lindee ................. A22C 7/0038 426/389 |

FOREIGN PATENT DOCUMENTS

| | | |
|---|---|---|
| EP | 2289462 | 3/2011 |
| EP | 2399695 | 12/2011 |
| JP | 2003-251701 | 9/2003 |
| JP | 2003251701 A * | 9/2003 |
| WO | 2011/011818 | 2/2011 |
| WO | PCT/EP2013/068875 | 9/2013 |

OTHER PUBLICATIONS

German Office Action for German Priority Patent Application No. 10 2012 216 793.5, dated Jun. 14, 2013, 7 pages.

* cited by examiner

METHOD AND DEVICE FOR POWDER BED-BASED ADDITIVE PRODUCTION OF A COMPONENT

CROSS REFERENCE TO RELATED APPLICATIONS

This application is based on and hereby claims priority to International Application No. PCT/EP2013/068875 filed on Sep. 12, 2013 and German Application No. 10 2012 216 793.5 filed on Sep. 19, 2012, the contents of which are hereby incorporated by reference.

BACKGROUND

The invention relates to a method for powder-bed-based additive production of a component, in which the component is made in layers on the surface of a construction platform.

In additive production method, repeatedly, a layer of the powder bed is made on the construction platform, and the layer of the component to be produced is made by melting-on of the powder. In other words, the layer of the component to be produced is made by melting-on the powder bed in the region of the component to be produced, wherein the layer of the powder bed is converted into a part of the component as a result of melting-on of the material.

The invention additionally relates to a system for powder-bed-based additive production of a component.

A method and a system for executing the method of the type specified at the outset are described, for example, in EP 2 289 462 A1. In this case, parts can be produced continuously by the powder-bed-based production method, without set-up times arising for the system, if the latter, following completion of one component, is prepared for the production of a new component. This is achieved in that the film planes applied by the powder bed are oriented obliquely in relation to the surface of the construction platform. The angle of inclination of the oblique powder layers in this case is selected such that the particles of the powder do not slip off toward the construction platform.

The component to be produced can be produced piece by piece on the construction platform, wherein the layers of the component are oriented obliquely in relation to the surface of the construction platform, according to orientation of the layers of the powder bed.

The oblique orientation of the layers of the powder bed is an example of the fact that these layers are not parallel to the surface of the construction platform. Not parallel, in the context of this discussion, means that an angle having a value of >0° can be measured at least between parts of the surface of the current layer of the powder bed and parts of the surface of the construction platform.

The production of components according to EP 2 289 462 A1 is effected on a substrate that is guided through underneath the dosing device for the powder. In this case, the individual powder layers can be made by the dosing device. The linear movement of the substrate necessarily results in an increased structural space for the system, in order that the latter can be operated continuously, at least over a certain period of time.

SUMMARY

One potential object relates to specifying a method and a device for powder-bed-based additive production of a component that, on the one hand, enable the components to be produced continuously and, on the other hand, occupy a comparatively small structural space.

The inventor proposes, by the method specified at the outset, in that the interior wall of a horizontally oriented hollow cylinder is used as a construction platform. The powder bed is made inside the hollow cylinder by partially filling the latter with powder. The partial filling ensures that a surface of the powder bed that is accessible for execution of the method is made in the interior of the hollow cylinder. Moreover, new layers of the powder bed are made following a rotation of the hollow cylinder about its central axis. The surface of the powder bed is made such that it is not parallel to the surface of the construction platform, at least in sub-regions. Therefore, it is not a flat substrate that is used as a construction platform, but one having a simply curved surface, namely, the interior wall of the hollow cylinder. The construction platform therefore does not have to be lowered in order to make a component and, in order to make a further component, following making of the first component, it does not have to be displaced linearly in the plane of the construction platform. Rather, as a result of a rotation of the hollow cylinder, lowering of the component can be effected, both for the purpose of making a new layer of the powder bed and for the purpose of providing a new part of the construction platform for the production of a further component. In this case, advantageously, the hollow cylinder always occupies the same structural space, without the need for linear displacement of the hollow cylinder relative to the rest of the system. This has the advantageous effect that, for a maximal extent of the construction platform, only a minimal structural space need be provided for the hollow cylinder.

The hollow cylinder also makes it possible, advantageously, to effect continuous production of components, in an endless manner. The components are produced in the lower region, i.e. the geodetically lowermost region, since it is in this region that the powder is located, because of gravity. As a result of rotation of the hollow cylinder, the internal wall of the hollow cylinder that is concomitantly used as a construction platform becomes submerged in the powder bed, until the lowermost point of the interior of the hollow cylinder is reached. In this phase, by re-dosing of powder, a new layer of powder can in each case be applied on the component undergoing production, and can be melted-on, for example by a laser. Advantageously in this case, the volume of the powder bed remains the same, such that only the powder consumed as a result of hardening has to be re-dosed.

Once the component has been completed, the next component can be commenced, since, as a result of the progressive rotation between the processes of exposing the powder to light, free surface portions of the interior wall, which, as it were, are just being submerged in the powder bed, are again available in the meantime. Meanwhile, as a result of further rotation of the cylinder, the finished component emerges from the powder bed, until it is no longer in contact with the powder bed. According to a particular design, the completed components can be parted-off from the construction platform, wherein this may be effected, for example, by wire eroding.

The angular offset resulting from rotation of the cylinder must be selected to be so small that, in the region of the construction platform (i.e. on the outer radius of the interior of the hollow cylinder), the quantity of powder to be applied following the rotation does not exceed the maximally allowable film thickness of a layer. The applied film thickness lessens toward smaller radii of the interior. This must be taken into account in the irradiation of the layer for the purpose of producing the component being developed. In regions of lesser film thickness, the input of energy by the laser or similar radiation source must be reduced appropriately.

The component size is therefore dependent on the maximally possible filling of the hollow cylinder. In the case of a flat surface of the powder bed, the powder bed, as viewed in cross section, is constituted by a segment of a circle. The greatest depth thereof, and therefore the greatest possible height of the component to be made, is located at the lowermost point of the interior of the hollow cylinder.

However, by an appropriate dosing device, having a lip for wiping off powder particles, it is possible to produce a curved surface of the powder bed. Advantageously, this surface is curved concavely in relation to the interior wall of the hollow cylinder, such that the cross section of the powder bed becomes sickle-shaped. This makes it possible to achieve greater component heights already in the peripheral regions of the powder bed. It is also possible, advantageously, to produce a more uniform film thickness of the film layer if the surface of the new film layer has a curved profile. As a result, it is possible to achieve greater film thicknesses, even in regions of the component to be produced that are to be produced in the case of lesser radii of the interior.

Advantageously, the method can thereby be performed with greater efficiency.

It is also particularly advantageous if completed components are parted-off from the construction platform after reaching the upper half of the hollow cylinder, as a result of rotation of the latter. In this case, advantageously, there is already a certain distance from the surface of the powder bed, such that it is possible, advantageously, to prevent these components from falling into the powder bed. The components are appropriately secured beforehand, and removed from the interior of the hollow cylinder.

According to a further design, it is provided that, after the components have been parted-off, the construction platform be cleared of component residues resulting from the production process. Advantageously, for example, a milling head may be used for this purpose. The removal of the component residues ensures, advantageously, that the construction platform again has a defined surface that can serve as a basis for a new component.

The inventor further proposes the system specified at the outset, in which the construction platform is constituted by the interior wall of a horizontally oriented hollow cylinder that is mounted so as to be rotatable about its central axis, wherein the hollow cylinder is provided to receive the powder bed, in that the dosing device is disposed in the interior of the hollow cylinder. This system is suitable for executing the method specified above, thereby achieving the aforementioned advantages.

According to an advantageous design of the proposed system, it is provided that the dosing device have an oblong dosing aperture, which is parallel to the central axis of the hollow cylinder. With such a dosing device it is possible, advantageously, to dose powder with high accuracy over the entire length of the interior of the hollow cylinder, such that a comparatively large powder bed is made.

The dosing device additionally has a stock of powder, which feeds the dosing aperture. Moreover, the dosing aperture can also be used to produce a defined surface of the powder bed once dosing has been effected. For this purpose, the dosing aperture, or a lip attached to the dosing aperture, is drawn over the surface of the powder bed. Excess powder is thereby removed, such that, advantageously, the powder bed has a defined surface. This is a prerequisite for a high dimensional accuracy of the parts produced.

According to another design, it is provided that a parting device for the completed components be provided outside of the volume, in the interior of the hollow cylinder, that is provided for the powder bed. This parting device should part-off the components close to the construction platform, i.e. close to the interior wall of the hollow cylinder. This can be achieved, for example, by the voltage of a wire that can be used to perform wire eroding. The parting device must be disposed outside of the powder bed, in order that, following their fabrication, the parts can first emerge from the powder bed. The dielectric required for the wire eroding process is constituted by the protective gas in the interior, which also prevents oxidation of the additively produced parts.

According to a particular design, it is provided that a collecting device for the parted-off components be provided beneath the parting device, in the interior of the hollow cylinder. Such a collecting device may include, for example, a collecting tray or a chute, on to which the parted-off, completed component falls. The component is thereby advantageously prevented from striking against the surface of the powder, which must have a defined surface in order to produce dimensionally accurate components. At the same time, the component can easily be transported out of the hollow cylinder via a collecting device realized as a chute.

Furthermore, it may be provided, advantageously, that a smoothing device, in particular a tool for surface machining by removal of material, be in engagement with the surface of the construction platform, after the parting device as viewed in the direction of rotation of the hollow cylinder. By such a smoothing device, the original surface condition of the interior wall of the hollow cylinder, serving as a construction platform, can be restored. In particular, component residues remaining on the construction platform following parting-off of the finished component are removed. For this, the smoothing device must be in engagement with the surface of the construction platform. This means that removal of the component residues and smoothing of the construction platform, for example by mechanical abrasion, is actually possible. Any abrasion of the surface of the construction platform may be measured, for example, optically. If the abrasion exceeds a measure that is critical for the component tolerances to be observed, the construction platform can be restored by application of material. In particular, the method performed in the hollow cylinder can be used for this purpose.

It is also advantageous if a radiation source for an energy beam, in particular a laser, is disposed outside of the interior of the hollow cylinder, and a deflection device for the energy beam is provided in the interior of the hollow cylinder. This allows the sensitive laser to be installed in a safe region of the system and, by the deflection device, it is possible to direct the laser beam on to differing parts of the surface of the powder bed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
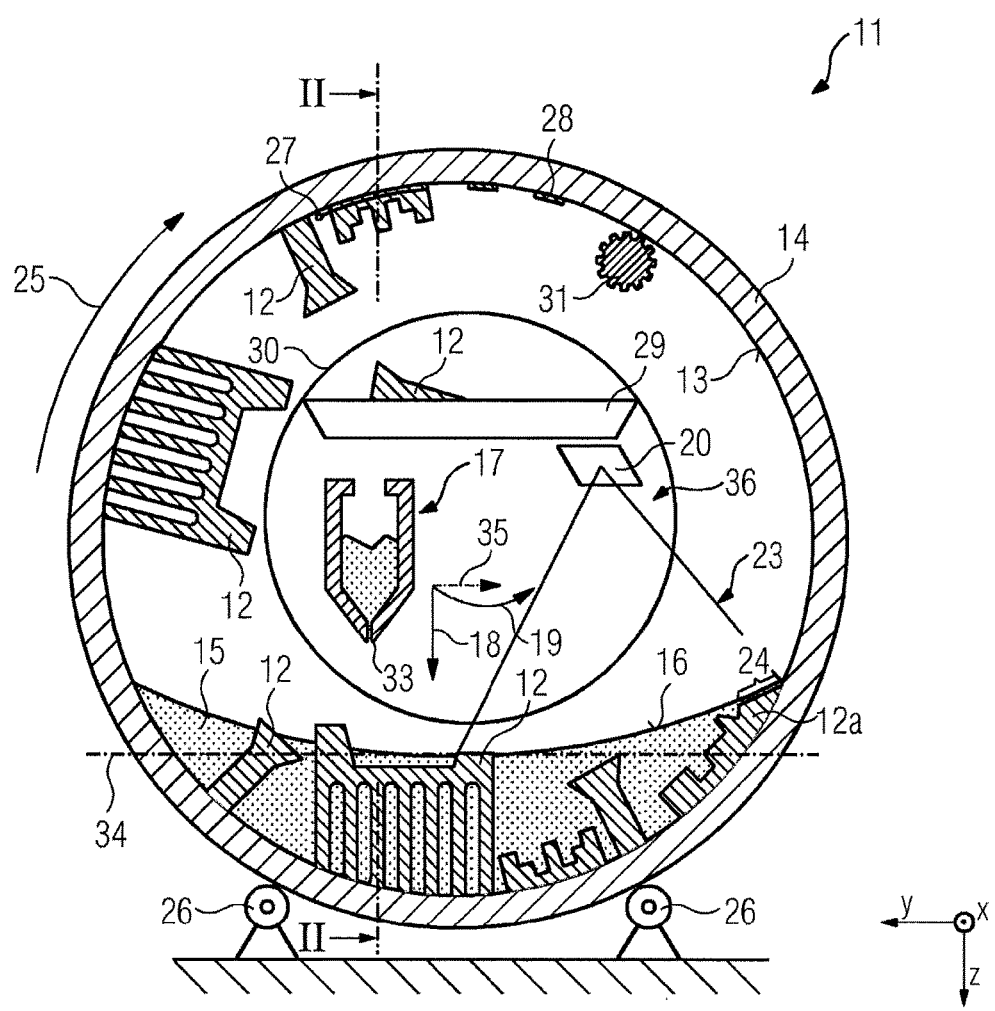
FIG. 1 an exemplary embodiment of the proposed system, in cross section.

Reference will now be made in detail to the preferred embodiments of the present invention, examples of which are illustrated in the accompanying drawings, wherein like reference numerals refer to like elements throughout.

A system 11 for powder-bed-based additive production of components is realized as a system for selective laser melting. In this system, components 12 can be produced by selective laser melting. Provided for this purpose is a construction platform 13, which is constituted by a hollow cylinder 14. The construction platform 13 is realized as an internal wall of the hollow cylinder 14 or, more precisely, by the internal wall of its envelope.

To enable the components 12 to be produced, a powder bed 15 is required, which, in the representation according to FIG. 1, has a concave surface 16 that is curved toward the construction platform 13. For this purpose, a dosing device 17 is lowered in the Z direction 18 on to the surface 16 of the powder bed 15, and is then moved substantially in the Y direction 19 along a curved path. By trickling of powder out of the dosing device 17, a layer of the powder, not represented in greater detail, can thereby be produced, in the form of a thin film, in the powder bed 15.

Via a mirror 20, a laser beam 21, not represented in greater detail (see FIG. 2), is then deflected in a sweeping manner in a region 23, as a result of which a layer of the component 12a currently being produced is made. The uppermost layer of the powder bed 15 in this case is melted-on on the required surface portion 24, i.e. in the region of the layer of the component 12a that is to be produced.

The hollow cylinder 14 is then rotated in the clockwise direction 25 about the X axis, in order that, in a manner not represented, a new layer of the powder bed, which also again covers the component 12a, can be produced by the dosing device 17. For the purpose of moving the drum, the latter is mounted on rollers 26, which can be moved by a drive, not represented in greater detail.

Components 12, once completed, can be rotated slowly out of the powder bed by progressive rotation of the hollow cylinder. They gradually reach the upper region of the interior of the hollow cylinder, where a parting device 27, in the form of an eroding wire, is provided. As can be seen, the component can be parted-off from the construction platform device by the eroding wire, with component residues 28 remaining on the construction platform 13. The parted-off components 12 fall on to a collecting device 29 in the form of a chute, and can slide on the latter, through an end-face aperture 30, out of the hollow cylinder 14. Around the hollow cylinder 14 there is a housing, not represented, that hermetically seals off the hollow cylinder against the environment, and that is filled with a protective gas. The components 12 may be removed by a sluice, likewise not represented.

When the hollow cylinder 14 is rotated further, the component residues 28 come into engagement with a smoothing device 31 in the form of a milling roller or abrasive roller. By removing the component residues, this roller restores a smooth construction platform 13, which provides a defined base for the production of new components as soon as the smoothed part of the interior wall of the hollow cylinder is submerged again in the powder bed 15.

Figure 2:
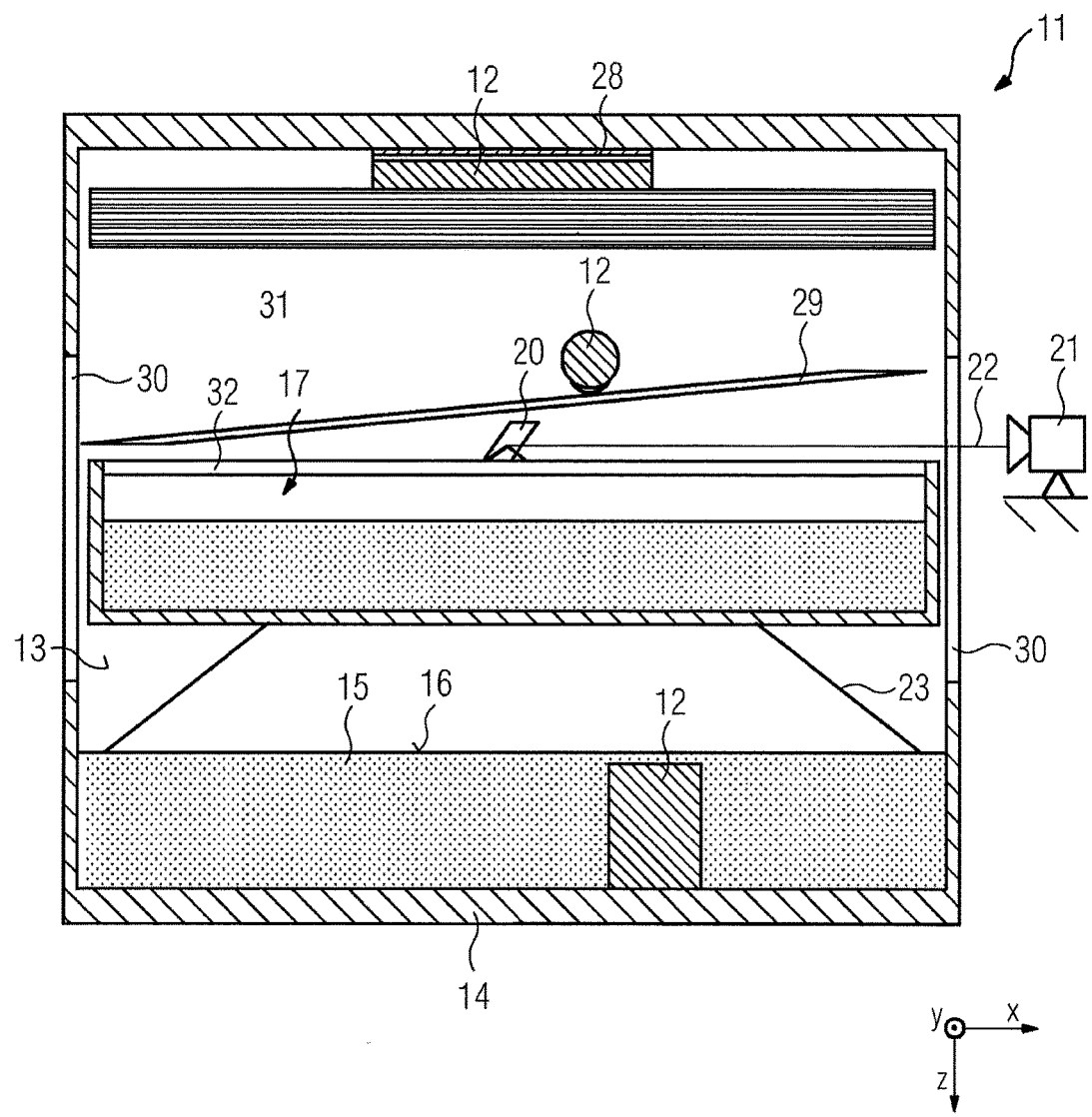
FIG. 2 the system as shown in FIG. 1, in the section II-II, wherein an exemplary embodiment of the proposed method can be performed by the exemplary embodiment of the system, and is explained in greater detail in combination with the figures.

FIG. 2, in addition, shows the extent of the hollow cylinder 14 in the X direction. Firstly, a longitudinal section through the dosing device 17 is shown. It is shown that the stock container of the dosing device can be filled via an aperture 32. A dosing aperture 33, as shown in FIG. 1, is realized in the form of a slot, and is not visible in FIG. 2 because of the position of the section line II-II. However, the dosing aperture extends along the entire length in the X direction of the dosing device 17.

It can also be seen that the region 23, in which the laser can be moved by adjustment of the mirror 20, extends over almost the entire length in the X direction of the hollow cylinder 14. It can also be seen that a component 12, present on the chute 29, can be removed from the aperture 30. Disposed on the opposite end face, likewise, is an aperture 30, through which the laser beam 22, generated by the laser 21, can be directed on to the mirror 20. The laser beam in this case is also guided by a lens arrangement, not represented, for beam formation.

The smoothing device also extends over the majority of the length of the hollow cylinder 14, as viewed in the X direction. Also shown is a component 12 that is just in the process of being parted off by the parting device 27, not represented (the latter is located in front of the plane of the drawing, see FIG. 1). The component residue 28 in this case remains on the construction platform 13.

Unlike FIG. 1, FIG. 2 shows a powder bed 15 that has a flat surface 16. In FIG. 1, this powder bed is indicated by a dot-dash line 34. For this, the dosing device must be moved in the Y direction, according to the dot-dash arrow 35. This is a rectilinear movement. It is also clear from FIG. 1 that the powder bed thereby receives a lesser volume than if realized in a concave manner, and therefore the component 12a must be produced on a lower portion of the interior wall of the hollow cylinder 12.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A system for powder-bed-based additive production of a component, the system comprising:
   a horizontally oriented hollow cylinder mounted to rotate about a central axis, an interior wall of the hollow cylinder having a first radius measured from the central axis and used as a construction platform; and
   a dosing device configured to partially fill the hollow cylinder with powder to make a powder bed having a surface that is not parallel to the interior wall of the hollow cylinder, forming an arc with a second radius and a center point away from the central axis, at least in sub-regions, the dosing device being disposed in an interior of the hollow cylinder; and
   an eroding wire in an interior of the hollow cylinder configured to part-off completed components from the construction platform.

2. The system as claimed in claim 1, wherein the dosing device includes an oblong dosing aperture, which is parallel to the central axis of the hollow cylinder.

3. The system as claimed in claim 1, further comprising: collecting device for collecting the parted-off completed components, the collecting device being provided beneath the parting device in the interior of the hollow cylinder.

4. The system as claimed in claim 1, further comprising: a smoothing device that is configured to remove material that is in engagement with the surface of the construction platform after the parting device has parted-off the completed components from the construction platform.

5. The system as claimed in claim 1, further comprising: a radiation source configured to produce an energy beam; and a deflection device configured to deflect the energy beam, the deflection device being provided in the interior of the hollow cylinder.

6. The system as claimed in claim 1, wherein the parting device is an eroding wire.

7. The system as claimed in claim 4, wherein the smoothing device is a milling roller or an abrasive roller.

8. The system as claimed in claim 5, wherein the radiation source is a laser.

9. The system as claimed in claim 5, wherein the deflection device is a mirror.

\* \* \* \* \*